(12) United States Patent
Kung et al.

(10) Patent No.: US 6,317,314 B1
(45) Date of Patent: Nov. 13, 2001

(54) REINFORCED HOUSING FOR A MODULE OF A PORTABLE COMPUTER

(75) Inventors: Shao-Tsu Kung; Ming-Hsun Chou, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/524,532

(22) Filed: Mar. 13, 2000

(51) Int. Cl.$^7$ .................................................. G06F 1/16
(52) U.S. Cl. .................... 361/680; 361/679; 361/681; 361/682; 361/683; 361/686
(58) Field of Search .................... 361/679–683, 361/686

(56) References Cited

U.S. PATENT DOCUMENTS

| | | | |
|---|---|---|---|
| 5,268,816 | * 12/1993 | Abell, Jr. et al. | 361/729 |
| 6,101,088 | * 8/2000 | Nakajima et al. | 361/686 |

* cited by examiner

Primary Examiner—Leo P. Picard
Assistant Examiner—Yean-Hsi Chang
(74) Attorney, Agent, or Firm—Pillsbury Winthrop LLP

(57) ABSTRACT

A housing for a module unit of a portable computer includes a surrounding wall member and a cover member. The surrounding wall member includes a rectangular surrounding wall, and a partition disposed in and spanning a rectangular area confined by the surrounding wall. The partition cooperates with the surrounding wall to form a first receiving space with a first open end, and a second receiving space with a second open end. The partition is formed with an opening for intercommunicating the first and second receiving spaces. The cover member is formed separately from and is mounted on the surrounding wall member at the first open end of the first receiving space to cover the first receiving space. The first receiving space is adapted to receive a circuit board therein. The second receiving space is adapted to receive the module unit therein. Electrical connection between the module unit and the circuit board can be established via an electrical conductor unit that is extended through the opening in the partition.

7 Claims, 4 Drawing Sheets

REINFORCED HOUSING FOR A MODULE OF A PORTABLE COMPUTER

BACKGROUND OF THE INVENTION

1. Field of the Invention

The present invention relates to a reinforced housing for a module unit of a portable computer, more particularly to a housing which is light weight and has a variable appearance and which can be produced at a lower material cost, and to a portable computer module that uses the reinforced housing.

2. Description of the Related Art

It is known to form a conventional portable computer housing from an aluminum-magnesium alloy to provide sufficient strength to resist deformation due to accidental collision. Generally, the keyboard housing and the display housing of the conventional portable computer are entirely made from sheets of the aluminum-magnesium alloy. The material cost of the portable computer is thus relatively high, and the weight of the portable computer is relatively heavy. In addition, with the use of the aluminum-magnesium alloy, the conventional portable computer is provided with an appearance which is non-changeable. It is not possible for the user to change the appearance of the portable computer based on his or her preference or according to the occasion on which the portable computer is used.

SUMMARY OF THE INVENTION

Therefore, a first object of the present invention is to provide a reinforced housing for a module unit of a portable computer to overcome the aforementioned problems encountered in the conventional portable computer housing.

A second object of the present invention is to provide a keyboard module of a portable computer that uses the reinforced housing of the present invention.

A third object of the present invention is to provide a display module of a portable computer that uses the reinforced housing of the present invention.

According to a first aspect of the present invention, a housing for a module unit of a portable computer includes a surrounding wall member and a cover member. The surrounding wall member includes a rectangular surrounding wall, and a partition disposed in and spanning a rectangular area confined by the surrounding wall. The partition cooperates with the surrounding wall to form a first receiving space with a first open end, and a second receiving space with a second open end. The partition is formed with an opening for intercommunicating the first and second receiving spaces. The cover member is formed separately from and is mounted on the surrounding wall member at the first open end of the first receiving space to cover the first receiving space. The first receiving space is adapted to receive a circuit board therein. The second receiving space is adapted to receive the module unit therein. Electrical connection between the module unit and the circuit board can be established via an electrical conductor unit that is extended through the opening in the partition.

According to a second aspect of the present invention, a keyboard module of a portable computer includes a keyboard housing, a main computer board, a keyboard unit, and an electrical conductor unit. The keyboard housing includes a surrounding wall member and a cover member. The surrounding wall member includes a rectangular surrounding wall, and a partition disposed in and spanning a rectangular area confined by the surrounding wall. The partition cooperates with the surrounding wall to form an upper receiving space with a top open end, and a lower receiving space with a bottom open end. The partition is formed with an opening for intercommunicating the upper and lower receiving spaces. The cover member is formed separately from and is mounted on the surrounding wall member at the bottom open end of the lower receiving space to cover the lower receiving space. The main computer board is mounted in the lower receiving space. The keyboard unit is retained in the upper receiving space, and is accessible via the top open end of the upper receiving space. The electrical conductor unit is disposed in the housing, and extends through the opening in the partition. The electrical conductor unit establishes electrical connection between the keyboard unit and the main computer board.

According to a third aspect of the present invention, a display module of a portable computer includes a display housing, a circuit board, a liquid crystal display panel, and an electrical conductor unit. The display module includes a display housing, a circuit board, a liquid crystal display panel and an electrical conductor unit. The display housing includes a surrounding wall member and a cover member. The surrounding wall member includes a rectangular surrounding wall, and a partition disposed in and spanning a rectangular area confined by the surrounding wall. The partition cooperates with the surrounding wall to form a front receiving space with a front open end, and a rear receiving space with a rear open end. The partition is formed with an opening for intercommunicating the front and rear receiving spaces. The cover member is formed separately from and is mounted on the surrounding wall member at the rear open end of the rear receiving space to cover the rear receiving space. The circuit board is mounted in the rear receiving space. The liquid crystal display panel is retained in the front receiving space, and is visible via the front open end of the front receiving space. The electrical conductor unit is disposed in the housing, and extends through the opening in the partition. The electrical conductor unit establishes electrical connection between the display panel and the circuit board.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
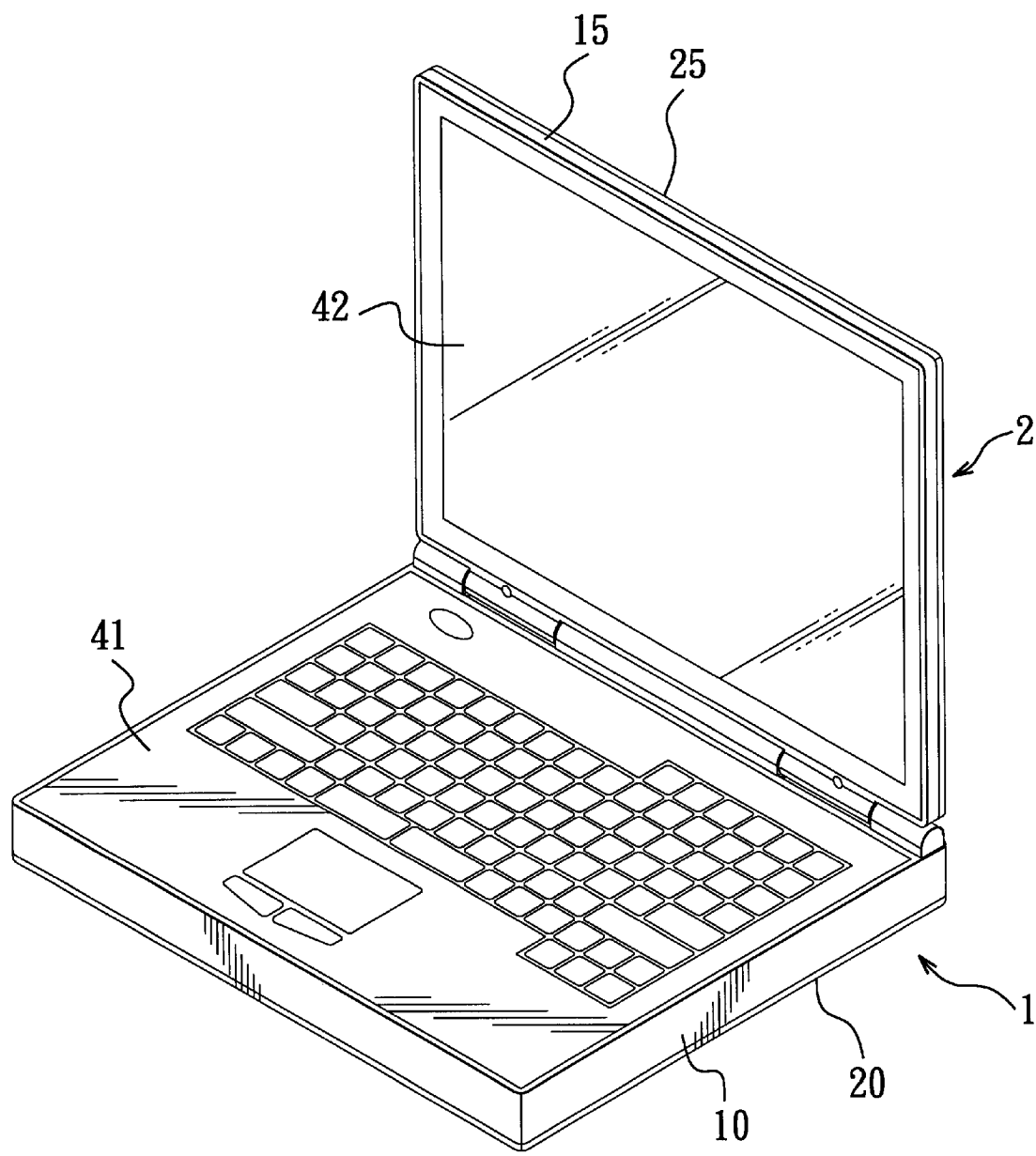
FIG. 1 is a perspective view showing a portable computer that embodies the present invention.
Figure 2:
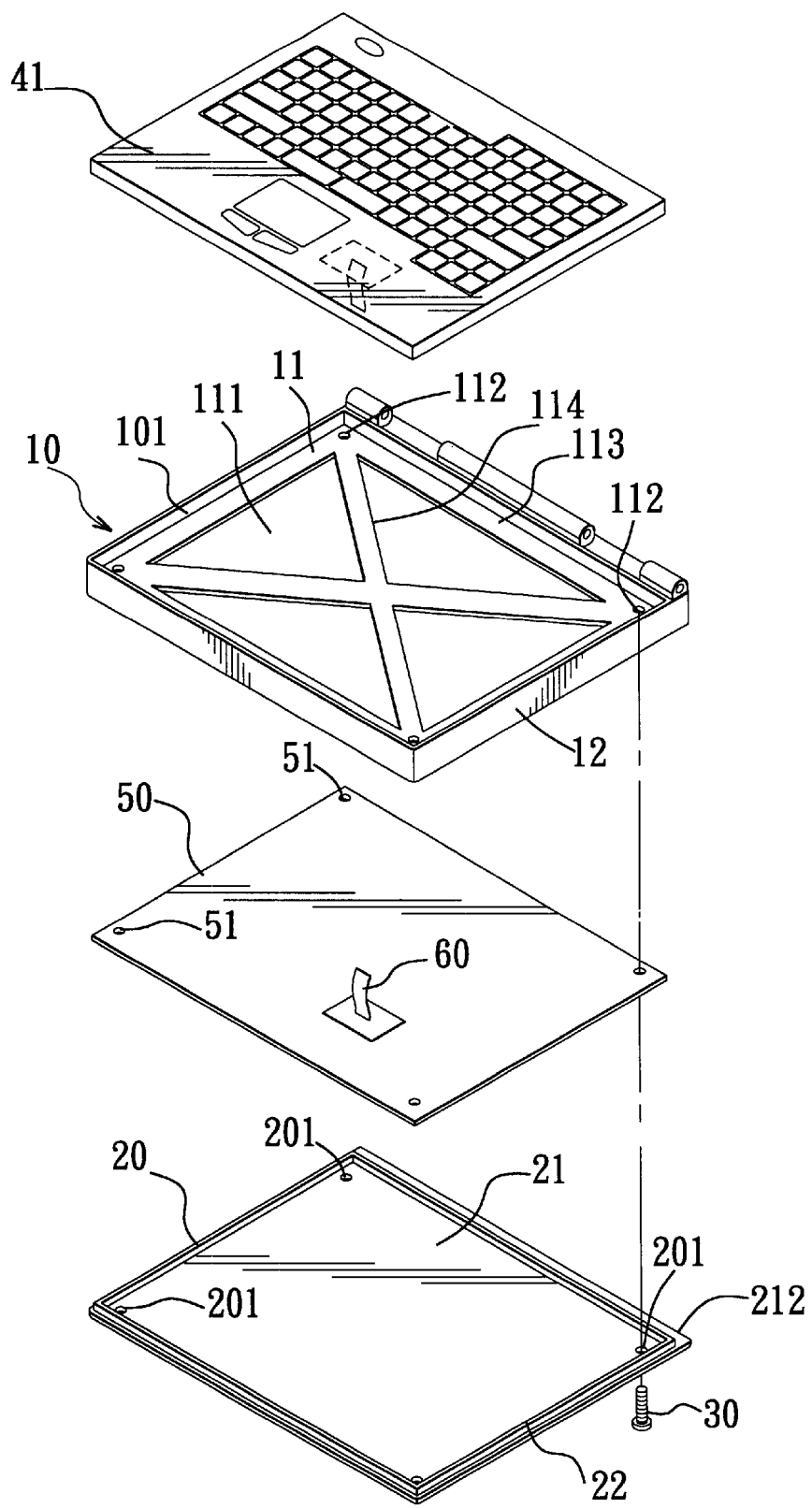
FIG. 2 is an exploded perspective view of a keyboard module of the portable computer of FIG. 1.
Figure 3:
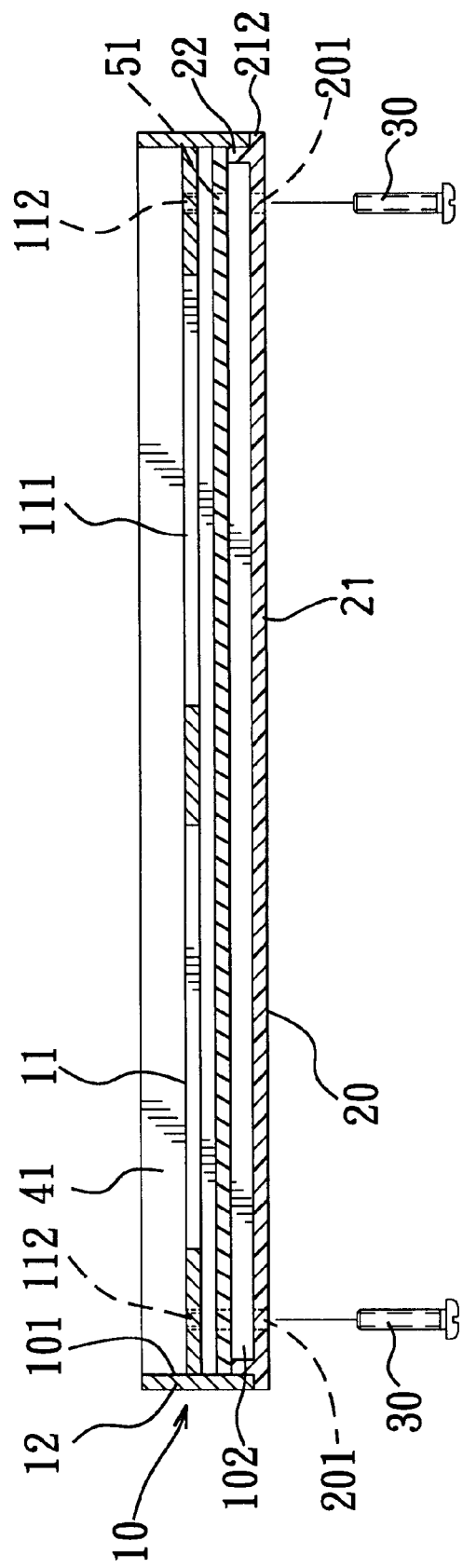
FIG. 3 is a cross-sectional view of the keyboard module of the portable computer of FIG. 1.

Referring to FIGS. 1 to 3, the reinforced housing of the present invention is embodied in a portable computer which includes a keyboard module 1 and a display module 2. The keyboard module 1 is shown to include a keyboard housing which has a surrounding wall member 10 and a cover member 20, a keyboard unit 41, a main computer board 50, and an electrical conductor unit 60.

The surrounding wall member 10 includes a rectangular surrounding wall 12, and a partition 11 disposed in and spanning a rectangular area confined by the surrounding wall 12. The partition 11 cooperates with the surrounding wall 12 to form an upper receiving space 101 with a top open end, and a lower receiving space 102 with a bottom open end. The partition 11 has a rectangular peripheral portion 113 which is connected integrally to the surrounding wall 12, and an X-shaped central portion 114 which Cooperates with the peripheral portion 113 to define openings 111 that intercommunicate the upper and lower receiving spaces 101, 102. The peripheral portion 113 has four corners formed with screw holes 112. Preferably, the surrounding wall member 10 is formed integrally from a metal, such as an aluminum-magnesium alloy.

The cover member 20 is formed separately from the surrounding wall member 10, and is mounted on the surrounding wall member 10 at the bottom open end of the lower receiving space 102 to cover the lower receiving space 102. The cover member 20 is formed integrally from plastic, and includes a rectangular cover plate 21 with a peripheral edge 212 that abuts against a bottom edge of the surrounding wall 12 of the surrounding wall member 10, and a rectangular flange 22 which extends upwardly from the cover plate 21 into the bottom open end of the lower receiving space 102 and which contacts fittingly an inner wall surface of the surrounding wall 12. The cover plate 21 has four corners formed with fastener holes 201 that are aligned respectively with the screw holes 112 in the partition 11.

The keyboard unit 41 is received fittingly and is retained in the upper receiving space 101, and is accessible via the top open end of the upper receiving space 101. The main computer board 50 is received in the lower receiving space 102, and has four corners formed with fastener holes 51 which are aligned respectively with the screw holes 112 in the surrounding wall 12 and with the fastener holes 201 in the cover plate 21. The keyboard housing further includes screw fasteners 30, each of which extends through an aligned set of the fastener holes 201, 51 and the screw holes 112 for fastening the cover member 20 and the main computer board 50 to the partition 11 of the surrounding wall member 10. Preferably, the keyboard unit 41 is retained in the upper receiving space 102 by extending threadedly the screw fasteners 30 into a bottom wall of the keyboard unit 41.

The electrical conductor unit 60 is disposed in the keyboard housing, and extends through one of the openings 11 to establish electrical connection between the main computer board 50 and the keyboard unit 41.

Figure 4:
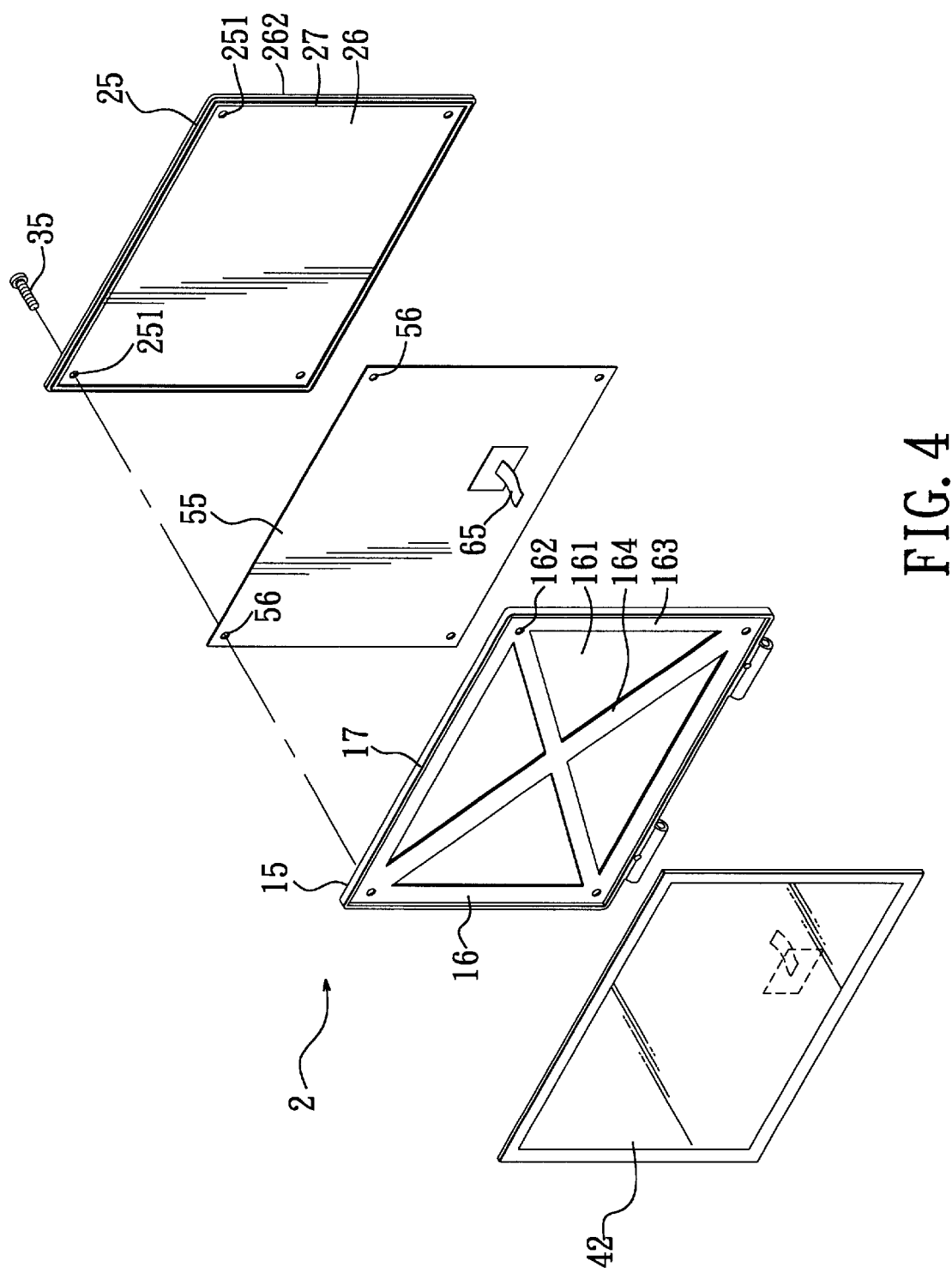
FIG. 4 is an exploded perspective view of a display module of the portable computer of FIG. 1.

Referring to FIG. 4, the display module 2 is shown to include a display housing which has a surrounding wall member 15 and a cover member 25, a liquid crystal display panel 42, a circuit board 55 and an electrical conductor unit 65. The cross-section of the display unit 2 is generally similar to that of the keyboard module 2 shown in FIG. 3.

The surrounding wall member 15 includes a rectangular surrounding wall 17, and a partition 16 disposed in and spanning a rectangular area confined by the surrounding wall 17. The partition 16 cooperates with the surrounding wall 17 to form a front receiving space with a front open end, and a rear receiving space (referring to FIG. 3) with a rear open end. The partition 16 has a rectangular peripheral portion 163 which is connected integrally to the surrounding wall 17, and an X-shaped central portion 164 which cooperates with the peripheral portion 163 to define openings 161 that intercommunicate the front and rear receiving spaces. The peripheral portion 163 has four corners formed with screw holes 162. Preferably, the surrounding wall member 15 is formed integrally from a metal, such as an aluminum-magnesium alloy.

The cover member 25 is formed separately from the surrounding wall member 15, and is mounted on the surrounding wall member 15 at the rear open end of the rear receiving space to cover the rear receiving space. The cover member 25 is formed integrally from plastic, and includes a rectangular cover plate 26 that has a peripheral edge 262 abutting against a rear edge of the surrounding wall 17 of the surrounding wall member 15, and a rectangular flange 27 that extends forwardly from the cover plate 26 into the rear open end of the rear receiving space and that contacts fittingly an inner wall surface of the surrounding wall 17. The cover plate 26 has four corners formed with fastener holes 251 that are aligned respectively with the screw holes 162 in the partition 16 of the surrounding wall member 15.

The display panel 42 is retained fittingly in the front receiving space, and is visible via the front open end of the front receiving space. The circuit board 55 is mounted in the rear receiving space. The circuit board 55 has four corners formed with fastener holes 56 which are aligned respectively with the screw holes 162 in the surrounding wall member 15 and the fastener holes 251 in the cover member 25. The display housing further includes screw fasteners 35, each of which extends through an aligned set of the fastener holes 251, 56 and the screw holes 162 for fastening the cover member 25 and the circuit board 55 to the peripheral portion 163 of the partition 16 of the surrounding wall member 10. The electrical conductor unit 65 is disposed in the display housing, and extends through one of the openings 161 to establish electrical connection between the circuit board 55 and the display panel 42.

During assembly, the cover members 20, 25 of the keyboard housing and the display housing may be produced to have different colors and patterns so as to provide consumers with a variety of choices as to the appearance of the portable computer.

Accordingly, the present invention provides a reinforced housing for a keyboard unit of a portable computer, and a reinforced housing for a display unit of a portable computer. The present invention further provides a keyboard module and a display module that use the reinforced housing. Since the reinforced housing of the present invention includes a surrounding wall member 10, 15 formed with openings 111, 161 and formed from aluminum-magnesium alloy, and a cover member 20, 25 formed from plastic, both the weight and the material cost of the portable computer can be significantly reduced. Moreover, as the cover member 20, 25 can be made of plastic material in different colors, and can be easily secured to and detached from the surrounding wall member 10, 15 of the housing, it is possible for the user to change the appearance of the portable computer based on his or her preference or on the occasion on which the portable computer is used.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A display module of a portable computer, comprising:
   a display housing including
      a surrounding wall member including a rectangular surrounding wall, and a partition disposed in and spanning a rectangular area confined by said surrounding wall, said partition cooperating with said surrounding wall to form a front receiving space with a front open end, and a rear receiving space with a rear open end, said partition being formed with an opening for intercommunicating said front and rear receiving spaces, and a cover member formed separately from and mounted on said surrounding wall member at said rear open end of said rear receiving space to cover said rear receiving space;

a circuit board mounted in said rear receiving space;

a liquid crystal display panel retained in said front receiving space and visible via said front open end of said front receiving space; and an electrical conductor unit disposed in said housing and extending through said opening in said partition, said electrical conductor unit establishing electrical connection between said display panel and said circuit board.

2. The display module of claim 1, wherein said partition has a rectangular peripheral portion that is connected integrally to said surrounding wall.

3. The display module of claim 2, wherein said cover member is rectangular in shape, and is fastened to said peripheral portion of said partition.

4. The display module of claim 3, wherein said cover member includes a cover plate having a peripheral edge that abuts against said surrounding wall at said rear open end of said rear receiving space, and a rectangular flange that extends from said cover plate into said rear open end of said rear receiving space and that contacts fittingly an inner wall surface of said surrounding wall.

5. The display module of claim 3, further comprising screw fasteners for fastening said cover member to said peripheral portion of said partition.

6. The display module of claim 1, wherein said surrounding wall member is formed integrally from a metal, and said cover member is formed integrally from plastic.

7. The display module of claim 6, wherein said surrounding wall member is formed integrally from an aluminum-magnesium alloy.

* * * * *